Jan. 2, 1968    T. C. R. SHEPHERD    3,361,370
WASTE DISPOSAL APPARATUS
Filed June 21, 1965    3 Sheets-Sheet 1

INVENTOR
Thomas Cropper Ryley Shepherd
BY
Russell + Moore
ATTORNEYS

INVENTOR
Thomas Cropper Ryley Shepherd
BY
Russell & Moore
ATTORNEYS

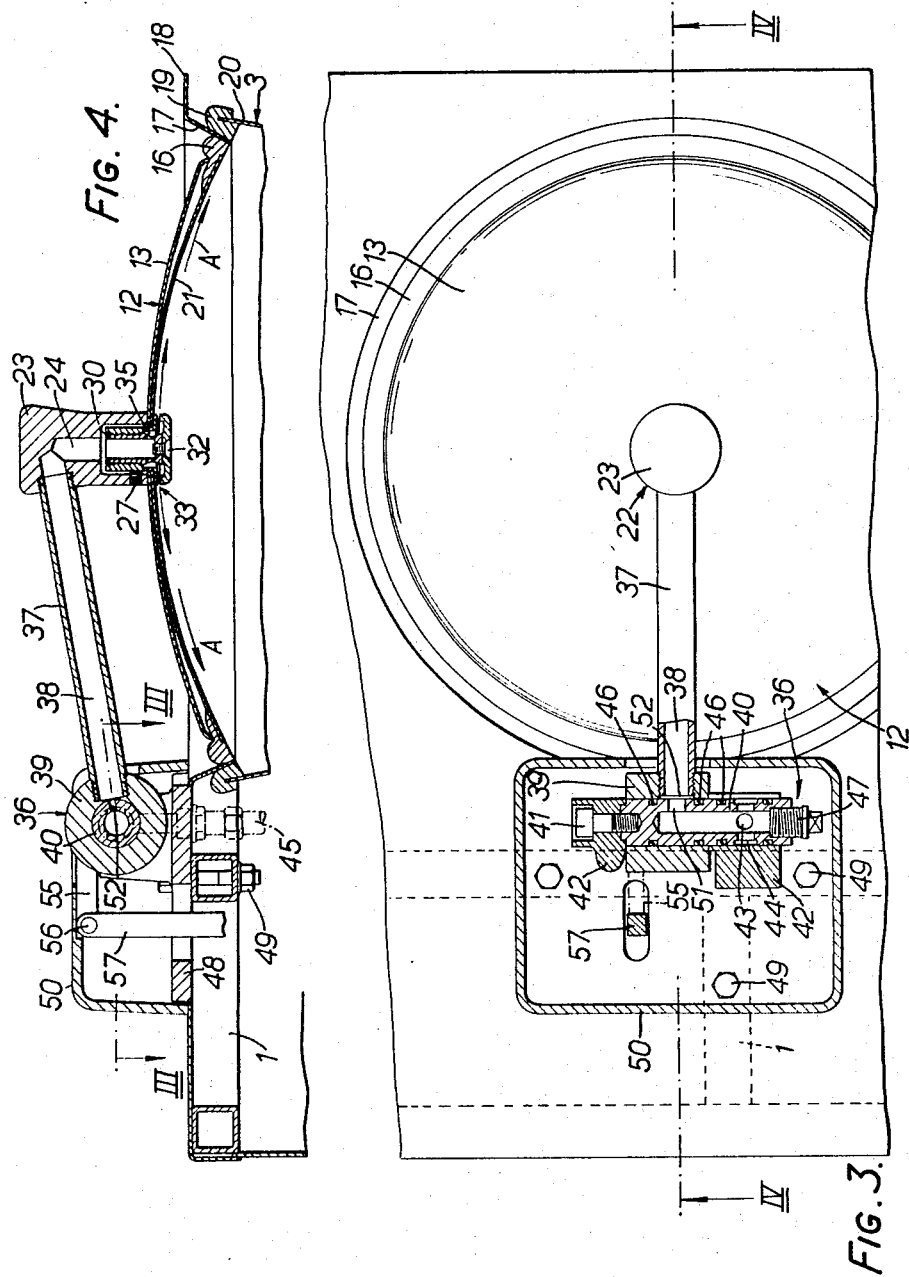

United States Patent Office 3,361,370
Patented Jan. 2, 1968

3,361,370
WASTE DISPOSAL APPARATUS
Thomas Cropper Ryley Shepherd, Arbour Hill House,
Ross-on-Wye, Herefordshire, England
Filed June 21, 1965, Ser. No. 465,575
Claims priority, application Great Britain, June 24, 1964,
26,082/64
11 Claims. (Cl. 241—46)

ABSTRACT OF THE DISCLOSURE

Waste disposal apparatus particularly for disposing of hospital waste such as disposable bed pans and other wares made from fibrous material. The apparatus comprises a casing with an upper inlet and an electrically driven comminutor located at a lower outlet. A closure is provided for the inlet. A nozzle delivers water as a cleansing flow initially over the inner surface of the closure, then over the inner surface of the casing and through the comminutor to the outlet.

---

The invention concerns improvements relating to waste disposal apparatus and relates more particularly though not exclusively to apparatus for disposal of hospital waste, such as disposable bed pans, urine bottles and other hospital wares made from fibrous material e.g. paper pulp.

According to the invention such apparatus comprises a casing having an upwardly facing inlet to receive the waste to be disposed of and a lower part communicating with said inlet and to which the waste is led from said inlet, an electrically driven rotary comminuting means located within the said lower part of the casing, an outlet from the casing below said comminuting means for discharge of comminuted material, a closure for said inlet, and nozzle means to deliver water under pressure as a flow of water over the under surface of said closure and thence down the inner surface of the casing and through the comminuting means to the discharge outlet.

Advantageously the nozzle means is located substantially centrally of the under surface of the closure to direct the water outwardly over such surface towards a peripheral edge of the closure and thence as an annular curtain downwardly over the inner surface of the casing towards the comminuting means.

Preferably the nozzle means presents a jet orifice of continuous ring form such as to direct a complete ring of water radially outwardly over the under surface of the closure so that radially beyond the nozzle means the whole of such surface is washed by the flow of water.

Advantageously a hinge assembly and arm mount the closure for upward movement to open the casing inlet, the arm extending from the hinge assembly to the central portion of the closure, and the hinge assembly and arm contain ducting to supply water to the nozzle means.

By the present invention the entire interior surface of the apparatus is washed down and foreign matter is carried away leaving the apparatus clean and fresh. The ability to wash the entire interior surface of the apparatus is particularly important when disposing of hospital waste to ensure that infected tissue and noxious waste can be disposed of quickly and easily without risk of leaving any residue in the apparatus since hygiene is of the utmost importance in hospitals.

Figure 1:
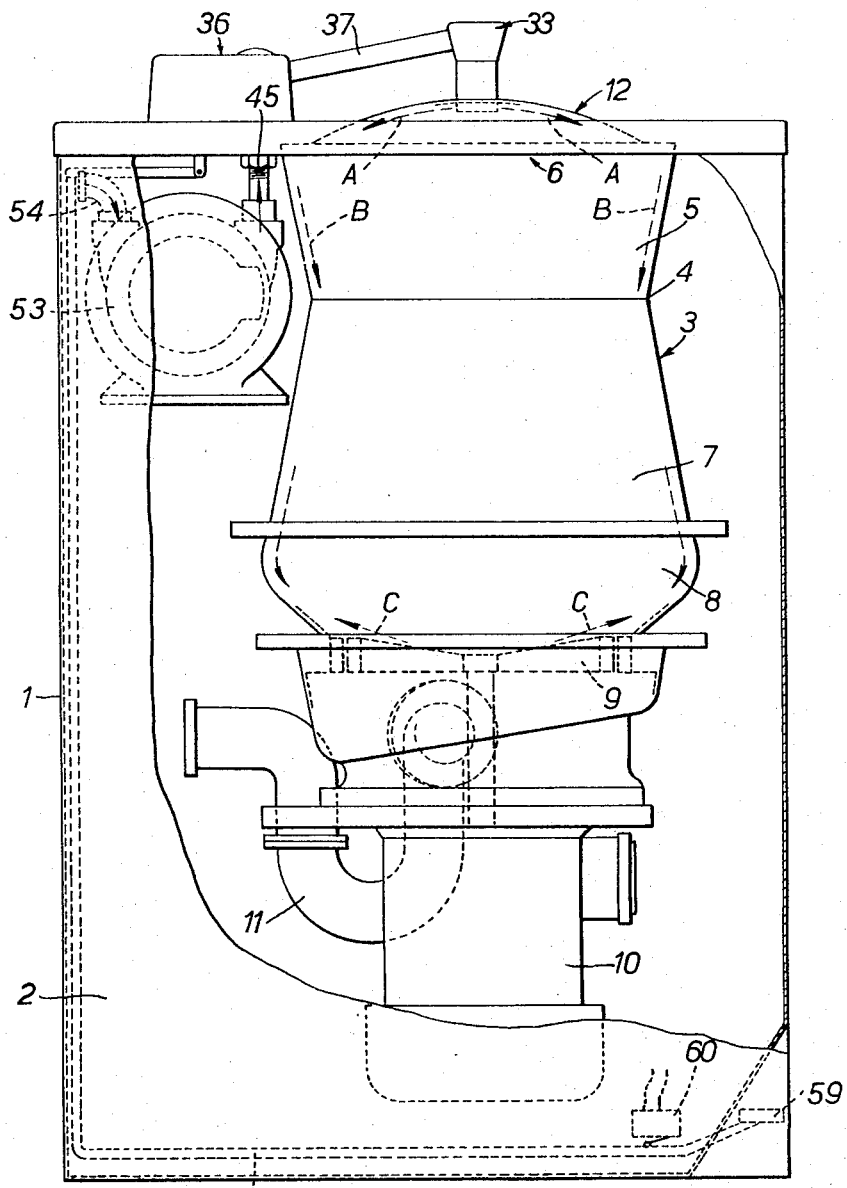
Figure 2:
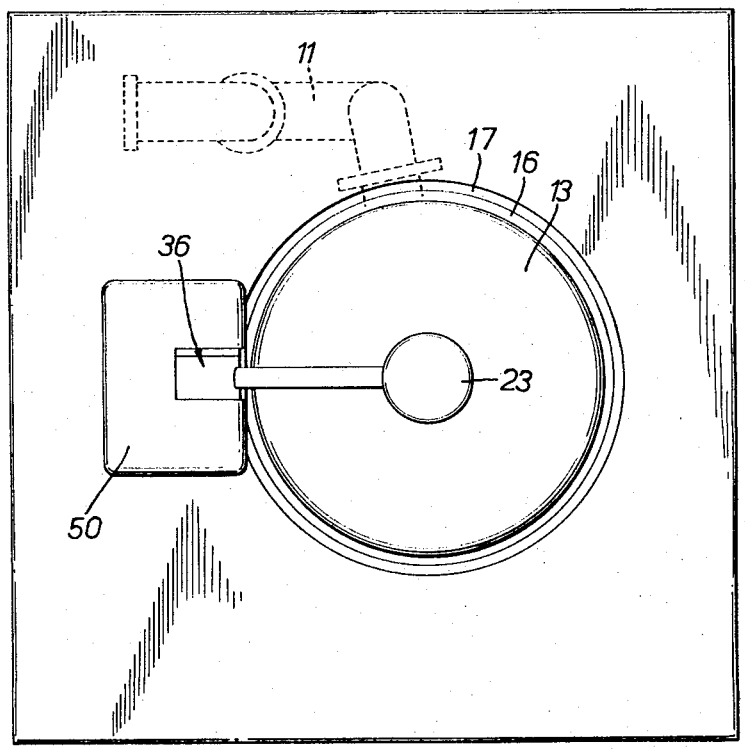
Figure 5:
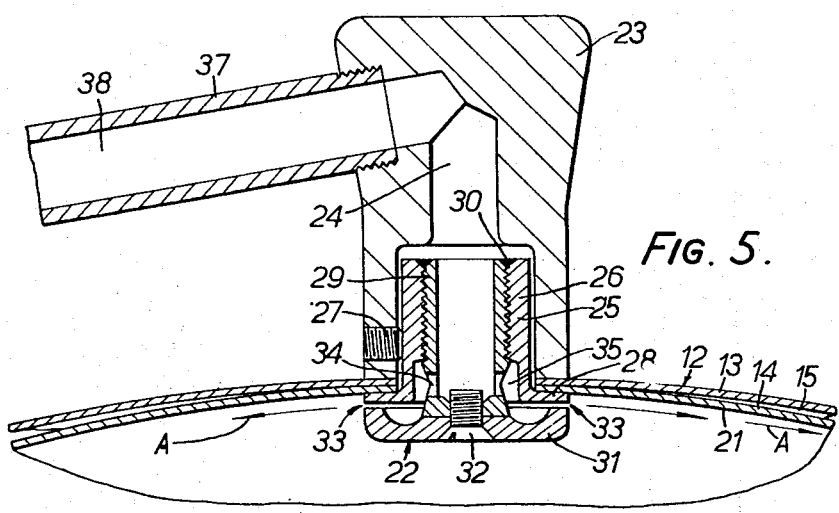

Embodiments of apparatus in accordance with the invention are hereinafter described by way of example with reference to the accompanying drawings wherein:

FIG. 1 is a side elevational view of such apparatus,
FIG. 2 is a plan view of same,
FIG. 3 is a plan view partly in section on the line III—III of FIG. 4 and showing details of the closure hinge assembly,
FIG. 4 is a section on the line IV—IV of FIG. 3 to illustrate the closure and hinge structure, and
FIG. 5 shows detail of the nozzle means in the closure.

The apparatus will be described as for disposing of fibrous or the like disposable bed pans although the invention is not so limited and has application to the disposal of waste generally.

The apparatus is housed in a metal frame with exterior panelling 2. A metal hopper casing 3 is of approximately hour glass shape with a waist portion 4 dividing the casing into an upper part 5 presenting an upwardly facing inlet 6 to receive a disposable bed pan or other waste to be disposed of, and a lower part 7, 8 communicating with the inlet and to which the waste is led. The waist portion is dimensioned to permit passage therethrough of a disposable bed pan. A rotary comminutor 9 driven by an electric motor 10 is located within the lower part of the casing. The casing has a suitable outlet 11 below the comminutor for discharge of comminuted material to drain. The casing has a substantially smooth inner surface down to the comminutor devoid of ledges, recesses, flanges and the like formations upon or within which waste material might lodge.

A closure 12 for the inlet is of circular dome shape formed by superposed sheets 13 and 14 spaced to provide an air space 15 and carrying a peripheral resilient sealing flange 16. The flange 16 is received within a downwardly tapering lip 17 of a top panel 18, the lip 17 being backed by a resilient annular seal 19 located around the top edge 20 of the casing 3. The under surface 21 of the closure including the flange 16, and the lip 17 and seal 19 presents a substantially continuous smooth surface with the closure closed. A nozzle means 22 is located centrally of the under surface of the closure in the apex of the dome shape. The nozzle comprises a housing 23 including a duct 24 and located over an opening through the centre of the closure, and an upper vent member 25 presenting a tubular portion 26 received through said opening and secured by a grub screw 27 in the housing and a flange portion 28 taking up against the underside of the closure around the opening. A tubular member 29 is secured, e.g. by welding at 30, in the tubular portion 26, and a lower vent member 31 is secured, e.g. by a screw 32, to a lower end of the tubular member 29 in spaced relation to the flange portion 28 so as to present between the upper and lower vent members a jet orifice 33 of continuous ring form. The tubular member 29 presents lateral openings 34 through which the housing duct 24 communicates with an annular space 35 which is defined by the vent members around the tubular member 29 and which leads to the jet orifice.

A hinge assembly 36 and arm 37 extending therefrom to the nozzle housing 23 mount the closure for upward movement to open the casing inlet, the hinge assembly and arm containing ducting as at 38 to supply water to the nozzle means. The arm 37 slopes downwards to fix in an annular boss 39 rotatably mounted on a hollow hinge pin 40 secured by a bolt 41 in a bearing block 42. The hinge pin presents ports 43 and a peripheral channel 44 for a water supply via the bearing block from a pipe connection 45. Appropriate water seals are indicated at 46. The hinge pin has an end plug 47. The assembly is mounted on a base 48 secured by bolting as at 49 to the frame, and has a suitable casing 50 allowing for the necessary movement of the arm 37. The hinge pin presents a lateral opening 51 communicating with a radial passage 52 through the boss 39 only when the closure is closed, the passage 52 leading into the arm ducting. Thus a rotary valve is incorporated in the hinge assembly so as to allow water supply therethrough upon closing the closure and to cut off such water supply with opening movement of the closure.

An electrically driven pump means 53 receives a water supply at 54 and pumps the water under pressure to the pipe connection 45 to the hinge assembly.

A lever 55 extends rearwards from the arm-carrying boss 39 and is connected by a clevis pin 56 with a drop link 57 extending downwards through an opening in the base 48 and comprised in a linkage 58 from a pedal means 59 to operate the closure; the linkage and pedal means are indicated diagrammatically.

An electric micro-switch means, e.g. as indicated at 60, is suitably arranged to be actuated by operation of the closure to start and stop the comminutor and the pump automatically upon respectively closing and opening the closure.

A time switch is preferably provided to maintain the comminutor and the pump in operation only for a specified time interval after closing the closure, sufficient to comminute and dispose of the waste to drain. Such a time switch is per se known and therefore not illustrated.

In operation, after raising the closure by the pedal operation to dispose of the bed pan or other waste into the inlet and then allowing the closure to close, the nozzle means will automatically deliver water under pressure and direct same as a complete ring of water flowing radially outwards over the under surface of the closure as indicated at A so that radially beyond the nozzle the whole of such surface is washed by the flowing stream of water. The water is thus directed towards the peripheral edge of the closure and thence flows as an annular curtain as indicated at B downwardly over the inner surface of the casing towards the comminutor, and through the comminutor to the discharge outlet.

The waist portion 4 in conjunction with the curtain of water flowing downwardly over the inner surface of the casing tends to confine comminuted material to the lower part 7 since during comminution material which is thrown outwardly as indicated at C against the inner surface of the casing is limited in its upward movement by the downward stream of water which ultimately carries such material down to the comminuting means, for further treatment if necessary, and thence to the discharge outlet. This effect is enhanced since the flow of water is greatest at the waist portion and because the energy of material thrown outwardly against the casing during comminution will have been at least largely dissipated if it reaches as high as the waist portion.

Due to the smooth form of joint of the closure into the casing, the confronting surfaces of the closure and of the inlet lip do not require to be washed by the stream of water supplied to the casing while ensuring that the high standards of hygiene required for hospital use are maintained.

The comminutor and pump will be maintained in operation only for the time interval determined by the time switch, or until the closure is prematurely opened, whichever is the earlier.

By way of modification, the pump may be omitted if the water supply mains pressure is adequate. Instead of pedal operation of the closure, the arm mounting same may serve as a direct handle. The pump 53 instead of being electrically driven may be driven by an extension shaft from the electric motor 10.

Instead of a fixed nozzle means providing the complete ring of water as described, a similarly located nozzle means may comprise one or more rotatably mounted jets operated by the pressure generated by the pump to sweep substantially the whole of the under surface of the closure with streams of water, with the same effect as above. Any other suitable form of nozzle or spray means may be used.

The micro-switch means such as indicated at 60 may instead be located immediately adjacent the hinge assembly and within the casing thereof so as to be operated e.g. by a cam rotatable with the arm-carrying boss of the assembly.

A detergent, disinfectant or deodorant may be automatically supplied to the apparatus during use e.g. with the supply of water to the casing. The rotor of the comminutor may be supplied with water in known manner, the water being discharged from the rotor under centrifugal force as jets e.g. directed upwardly of casing 3 and inwardly towards the central axis thereof or directed radially outwardly to clean the teeth of a ring of teeth with which the rotor co-acts. The detergent, disinfectant or deodorant may alternatively, or additionally, be supplied with water to the rotor. The water supply to the rotor may be from pump 53 or from the mains.

I claim.
1. Waste disposal apparatus comprising:
   (a) a casing, the casing having an upwardly facing inlet to receive the waste to be disposed of and a lower part communicating with said inlet and to which the waste is led from said inlet;
   (b) an electrically drivable rotary comminuting means located within said lower part of the casing;
   (c) an outlet from the casing below said comminuting means for discharge of comminuted material;
   (d) a closure for said inlet, and
   (e) nozzle means arranged to deliver water as a cleansing flow initially over substantially the entire inner surface of said closure, thence over substantially the entire inner surface of the casing and through the comminuting means to the discharge outlet.

2. Apparatus as claimed in claim 1 wherein the cleansing flow of water provides a substantially continuous film of water passing from the inner surface of the closure, across a joint of the closure with the casing, and thence as an annular curtain over the inner surface of the casing towards the comminuting means.

3. Waste disposal apparatus comprising:
   (a) a casing having an upwardly facing inlet to receive the waste to be disposed of and a lower part communicating with said inlet and to which the waste is led from said inlet;
   (b) an electrically drivable rotary comminuting means located within said lower part of the casing;
   (c) an outlet from the casing below said comminuting means for discharge of comminuted material;
   (d) a closure for said inlet, and
   (e) nozzle means, located substantially centrally of the under surface of the closure, which presents a jet orifice of continuous ring form such as to direct a complete ring of water radially outwardly over the under surface of the closure so that radially beyond the nozzle means the whole of such surface is washed towards a peripheral edge of the closure and thence the water continues as an annular curtain downwardly over the inner surface of the casing towards the comminuting means.

4. Apparatus according to claim 3 wherein said nozzle means comprises a housing including a duct and located over an opening through the centre of the closure, an upper vent member presenting a tubular portion received through said opening and secured in said housing and a flange portion taking up against the underside of the closure, a tubular member secured in said tubular portion, and a lower vent member secured to a lower end of said tubular member in spaced relation to said flange portion so as to present between the upper and lower vent members the jet orifice of continuous ring form, said tubular member presenting lateral openings through which the housing duct communicates with an annular space which is defined by the vent members around the tubular member and which leads to the jet orifice.

5. Waste disposal apparatus comprising:
   (a) a casing, the casing having an upwardly facing inlet to receive the waste to be disposed of and a lower part communicating with said inlet and to which the waste is led from said inlet;

(b) an electrically drivable rotary comminuting means located within said lower part of the casing;

(c) an outlet from the casing below said comminuting means for discharge of comminuted material;

(d) a closure for said inlet;

(e) nozzle means located substantially centrally of the under surface of the closure to deliver water outwardly over such surface towards a peripheral edge of the closure and thence as an annular curtain downwardly over the inner surface of the casing towards the comminuting means, and (f) a hinge assembly and arm which mount the closure for upward movement to open the casing inlet, the arm extending from the hinge assembly to the central portion of the closure, and the hinge assembly and arm containing ducting to supply water to the nozzle means.

6. Apparatus according to claim 5 wherein a rotary valve is incorporated in the hinge assembly so as to allow water supply therethrough upon closing the closure and to cut off such water supply with opening movement of the closure.

7. Apparatus according to claim 5 including electric switch means to start and stop the comminuting means automatically upon respectively closing and opening the closure.

8. Apparatus according to claim 7 including electrically driven pump means in the water supply to the hinge assembly, said switch means acting also to start and stop said pump means automatically upon respectively closing and opening the closure.

9. Apparatus according to claim 8 including a time switch to maintain said comminuting means and said pump means in operation only for a specified time interval after closing the closure.

10. Apparatus according to claim 5 including pedal means and linkage therefrom to the hinge assembly to operate the closure.

11. Waste disposal apparatus comprising a frame, a hopper casing carried in said frame and presenting a waist portion dividing the casing into an upper part having an upwardly facing inlet to receive the waste to be disposed of and a lower part to which the waste is lead from said inlet, said waist portion being dimensioned to permit passage therethrough of the waste into said lower part, an electrically driven comminuating means located within said lower part of the casing which presents a substantially smooth inner surface down to such comminuting means, an outlet from the casing below said comminuting means for discharge of comminuted material, a closure for said inlet, a hinge assembly and arm mounting said closure on said frame for upward movement to open the casing inlet, said arm extending from said hinge assembly to the central portion of the closure, and nozzle means located centrally of the under surface of the closure and connected to said arm to direct water to wash outwardly over such surface towards a peripheral edge of the closure and thence as an annular curtain downwardly over said inner surface of the casing towards the comminuting means, said hinge assembly and arm containing ducting to supply water under pressure to said nozzle means.

References Cited

UNITED STATES PATENTS

| | | | |
|---|---|---|---|
| 996,958 | 7/1911 | Wallick | 241—38 |
| 1,030,169 | 6/1912 | Emery | 241—46 |
| 2,708,074 | 5/1955 | Hoskins | 241—46 |
| 2,731,208 | 1/1956 | Dodd | 241—46 |
| 2,753,121 | 7/1956 | Elfenbein | 241—46 |

GERALD A. DOST, *Primary Examiner.*